(12) United States Patent
Weiden et al.

(10) Patent No.: US 8,420,961 B2
(45) Date of Patent: Apr. 16, 2013

(54) CONTACT BLOCK WITH INTERLOCK

(75) Inventors: Conrad S. Weiden, Chapel Hill, NC (US); T. Ray Robbins, Zebulon, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 308 days.

(21) Appl. No.: 12/803,216

(22) Filed: Jun. 22, 2010

(65) Prior Publication Data
US 2011/0308921 A1 Dec. 22, 2011

(51) Int. Cl.
*H01H 9/20* (2006.01)
(52) U.S. Cl.
USPC ............... 200/50.02; 200/16 R; 200/341
(58) Field of Classification Search ............... 200/50.01, 200/50.02, 16 R, 17 R, 43.01–43.13, 520, 200/329, 341
See application file for complete search history.

(56) References Cited

U.S. PATENT DOCUMENTS

| | | | |
|---|---|---|---|
| 3,239,641 | A | 3/1966 | Pettit |
| 5,800,206 | A | 9/1998 | Benni |
| 6,050,528 | A | 4/2000 | Bardy |
| 6,054,660 | A | 4/2000 | Benni |
| 6,198,058 | B1 | 3/2001 | Graninger et al. |
| 6,376,785 | B1 * | 4/2002 | Graninger ............. 200/50.02 |
| 6,444,932 | B1 | 9/2002 | Resmalm |
| 7,781,687 | B2 * | 8/2010 | Scherl et al. .......... 200/43.07 |

FOREIGN PATENT DOCUMENTS
CA 2604373 A1 3/2008

* cited by examiner

*Primary Examiner* — Amy Cohen Johnson
*Assistant Examiner* — Marina Fishman
(74) *Attorney, Agent, or Firm* — Nixon Peabody LLP

(57) ABSTRACT

An interlock contact block providing an automatic electrical disconnect for pushbutton operated contact blocks when components of the pushbutton switch assembly become sufficiently loose or dislodged from one another that proper operation of one or more contact blocks associated with the switch assembly can not be operated by the pushbutton assembly.

11 Claims, 7 Drawing Sheets

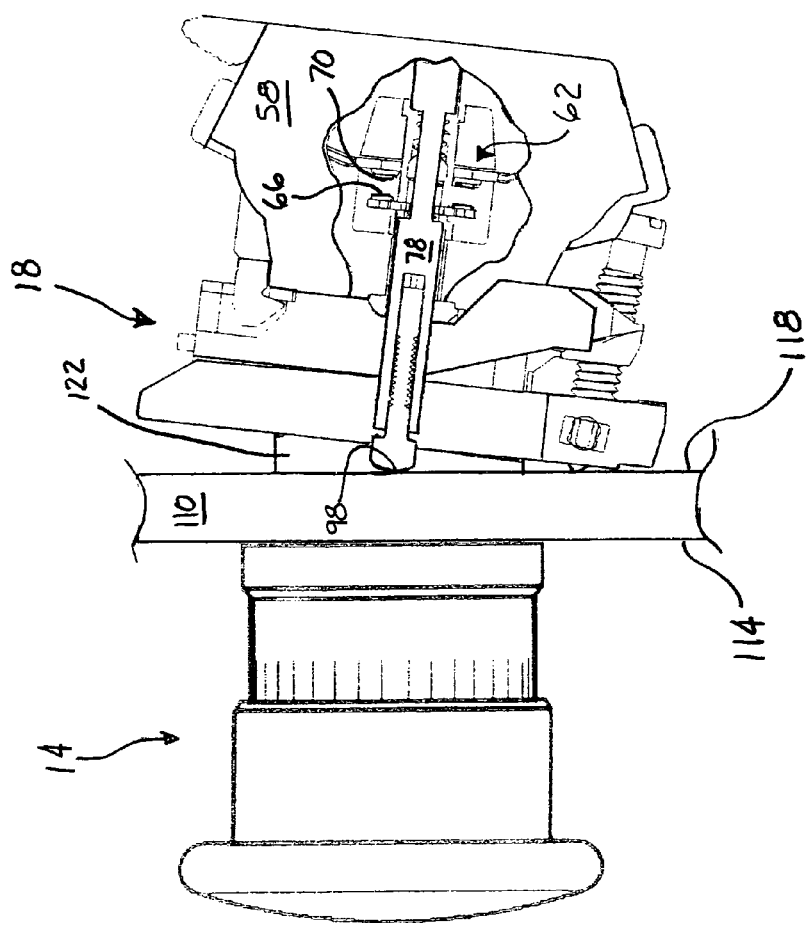

CONTACT BLOCK WITH INTERLOCK

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to pushbutton electrical operators and particularly to electrical interlocks for pushbutton electrical operators.

BACKGROUND OF THE INVENTION

Most pushbutton operators are installed in some type of enclosure such as an electrical box, panel board or machine station. The pushbutton is generally a multi component device, which include a button assembly located outside of the enclosure, a mounting block located inside of the enclosure and one or more electrical contact blocks attached to the mounting block and operated by the button assembly. In most applications a wall of the enclosure is clamped between the button assembly and the mounting block. Once the button assembly and mounting block are installed on the wall the pushbutton generally remains firmly attached to the wall. However, the function of some pushbuttons, such as shutting down equipment during an emergence, can result in situations where a human operator under stress hits the button with sufficient force to cause the contact block to become dislodged or sufficiently loose from the mounting block or the mounting block to become disconnected or separated from the button assembly. Sufficiently loose, as used herein, is defined to mean a condition in which proper operation of the pushbutton does not cause the electrical contacts of an attached contact block to change states. Interlocks for detecting a separation between the mounting block and the contact block are known. However, either situation can result in a condition where the pushbutton is prevented from properly operating the contact block. The thickness of the wall on which the pushbutton switch assembly is installed can also affect the operation of an interlock in detecting sufficient looseness of the mounting block or contact block. Therefore, it is desirable to have a mechanical interlock that will automatically open an electrical interlock contact if any part of the assembly become sufficiently loose that the pushbutton is not able to properly operate the electrical contact blocks connected to it.

SUMMARY OF THE INVENTION

The present invention provides an interlock contact block with a mechanical interlock that will automatically open an electrical interlock contact in the interlock contact block if the mounting block assembly should become sufficiently loose or separated from the pushbutton assembly, if the contact block becomes sufficiently loose or separated from the mounting block assembly, or if the mounting block assembly should become sufficiently loose or separated from a wall or surface on which the pushbutton switch assembly is mounted. The mechanical interlock also has an automatic adjustment to compensate for walls of different thickness.

BRIEF DESCRIPTION OF THE DRAWINGS

The features of the invention will be more clearly understood from the following detailed description of the invention read together with the drawings in which:

FIG. 7 illustrates a pushbutton switch assembly with an interlock contact block of the present invention where the mounting block has become sufficiently loose from the pushbutton operator assembly.

Figure 1:
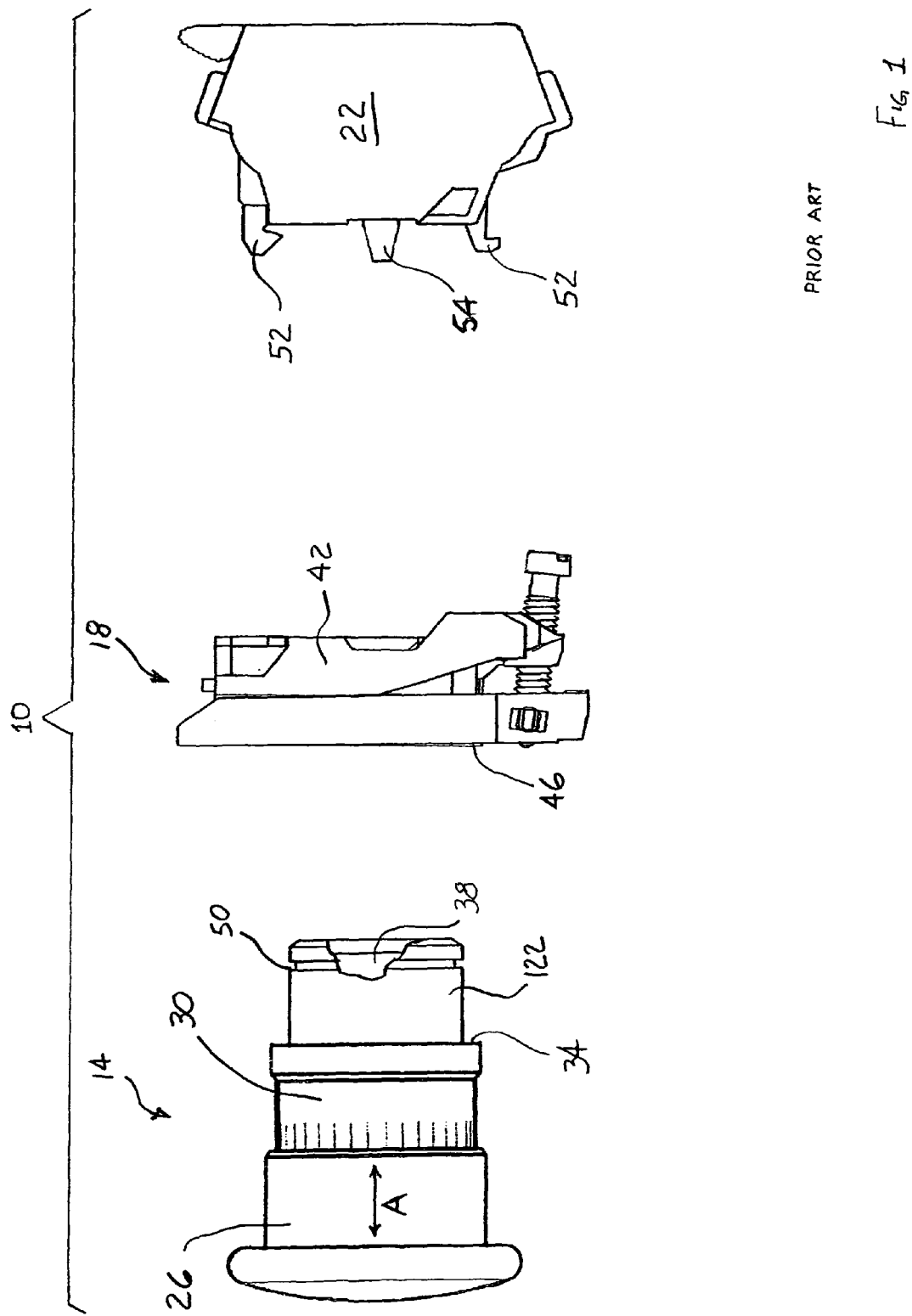
FIG. 1 is an exploded view of a pushbutton switch assembly of the prior art.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates, in exploded view, the major components of a pushbutton switch assembly of the prior art generally indicated by reference numeral 10. The pushbutton switch assembly 10 includes a button assembly 14, a mounting block assembly 18 and one or more contact blocks 22, each having one or both of a normally OPEN (NO) and/or a normally CLOSED (NC) contact (not shown). The button assembly 14 includes a button 26 and a barrel 30. The button 26 is moveably supported by the barrel 30 for movement between two positions as indicated by the arrow A. The barrel 30 defines a stepped flange 34. An operator 38, as shown in the cutaway section, is operably connected to the button 26 for common movement therewith.

Figure 2:
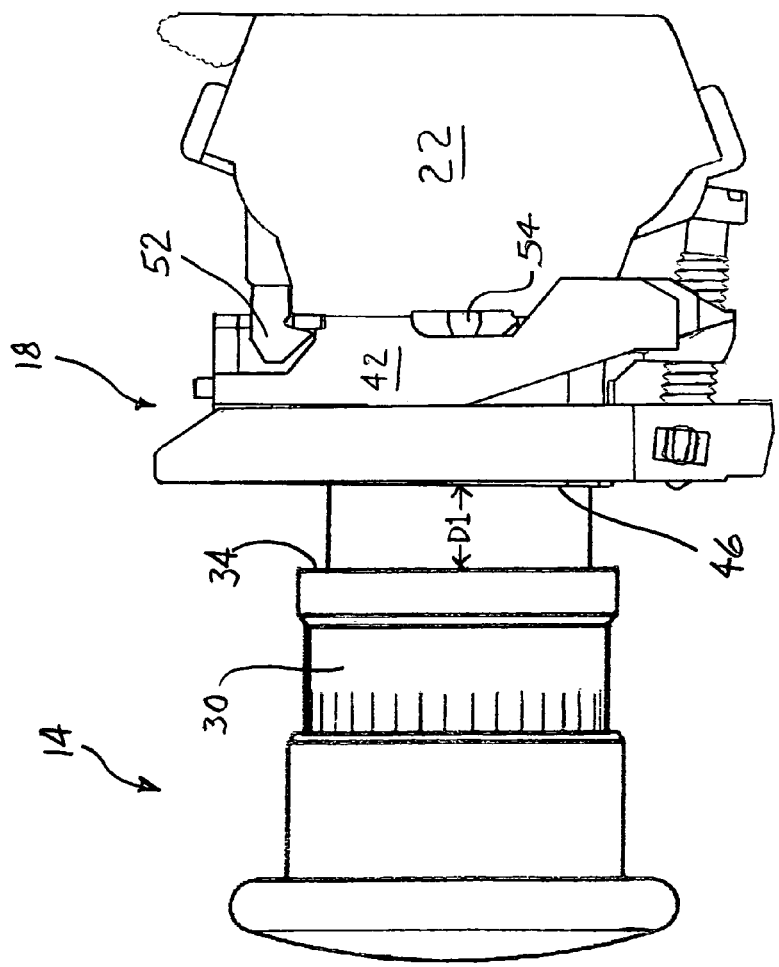
FIG. 2 illustrates an assembled pushbutton switch assembly of FIG. 1.

As shown in FIG. 2, when the switch 10 is assembled, the barrel 30 is mechanically connected to a body or base 42 of the mounting block assembly 18 such that a distance D1 is maintained between the stepped flange 34 of the barrel 30 and a surface 46 of the base 42. One means of making the mechanical connection between the button assembly 14 and mounting block assembly 18 is described in U.S. Pat. No. 6,050,528, wherein a spring biased ring lock or equivalent (not shown) located in the mounting block assembly 18 engages a groove 50 (see FIG. 1) or similar feature defined on the barrel 30. However, it is to be understood that the present invention is not limited to any particular means for mechanically connecting the button assembly 14 and mounting block assembly 18 and can include various threaded, locking ring and/or spring biased elements to accomplish the mechanical connection. The contact block 22 includes a means for attaching 52, to the contact block assembly 18 and a plunger 54, which is engaged by the operator 38 of the button assembly 14 to operate the NO and/or NC contacts of the contact block 22.

Figure 3:
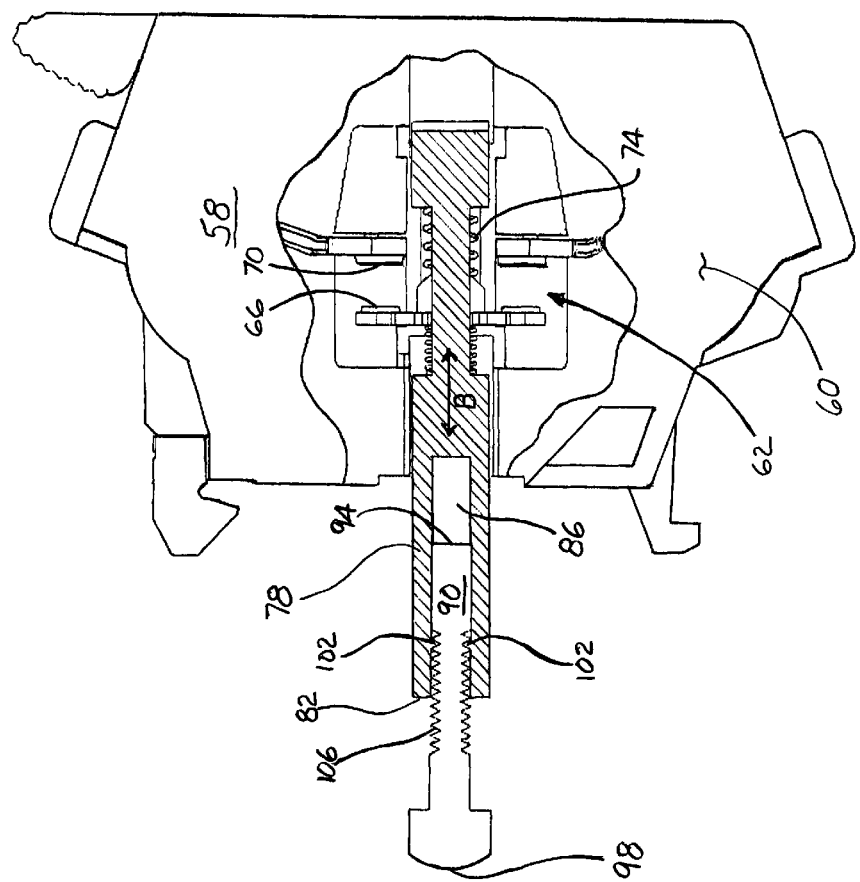
FIG. 3 illustrates an interlock contact block manufactured in accordance with the present invention.

FIG. 3 illustrates an interlock contact block of the present invention, which is generally indicated by reference numeral 58. Certain elements of the interlock contact block 58 are the same as those of contact block 22 and will use the same reference numbers for the remaining descriptions. The interlock contact block 58 includes a housing 60 that encloses at least one NORMALLY OPEN interlock contact 62. The housing 60 can also enclose other normally open and/or normally closed contacts that control other electrical functions and are operated by operator 38 as described above with respect to FIGS. 1 and 2. The interlock contact 62 includes at least one movable contact 66 and at least one fixed contact 70. The movable contact 66 is biased to the normally open position by a spring 74 and is operably connected to an interlock arm 78. The interlock arm 78 slidably extends outwardly from a portion of the housing 60 such that it is moveable with respect to the housing 60 in a linear direction generally indicated by arrow B. During the installation of the switch assembly 10 to a wall 110 (FIGS. 5-7) of an electrical enclosure, the interlock arm 78 engages the wall 110 of the enclosure and is forced into the housing 60, thereby moving the movable contact 66 to a CLOSED position where it makes electrical contact with fixed contact 70. The interlock arm 78 has a distal end 82 that defines a cavity 86 extending inwardly from the distal end 82. The interlock arm 78 also includes a self-adjusting member 90, which includes a proximate end 94 that is slidably received in the cavity 86 and a distal end 98. The distal end 98 of the adjusting member 90 is generally arc-shaped. The cavity 86 extends into the interlock arm 78 a distance sufficient to receive the full length of the self-adjusting member 90. The interlock arm 78 defines at least one retaining member 102 extending into the cavity 86 at some point near the distal end 82, but not more than half the depth of the cavity 86. The self-adjusting member 90 defines a series of notches or grooves 106 being substantially perpendicular to its longitudinal axis and located between its proximate end 94 and its distal end 98. As the self-adjusting member 90 is slidably received into the cavity 86 of the interlock arm 78, the grooves 106 are engaged by the at least one retaining member 102 of the interlock arm 78. The self-adjusting member 90 is ratcheted into the cavity 86 of interlock arm 78 such that the position of the self-adjusting member 90 with respect to the interlock arm 78 is maintained.

Figure 4:
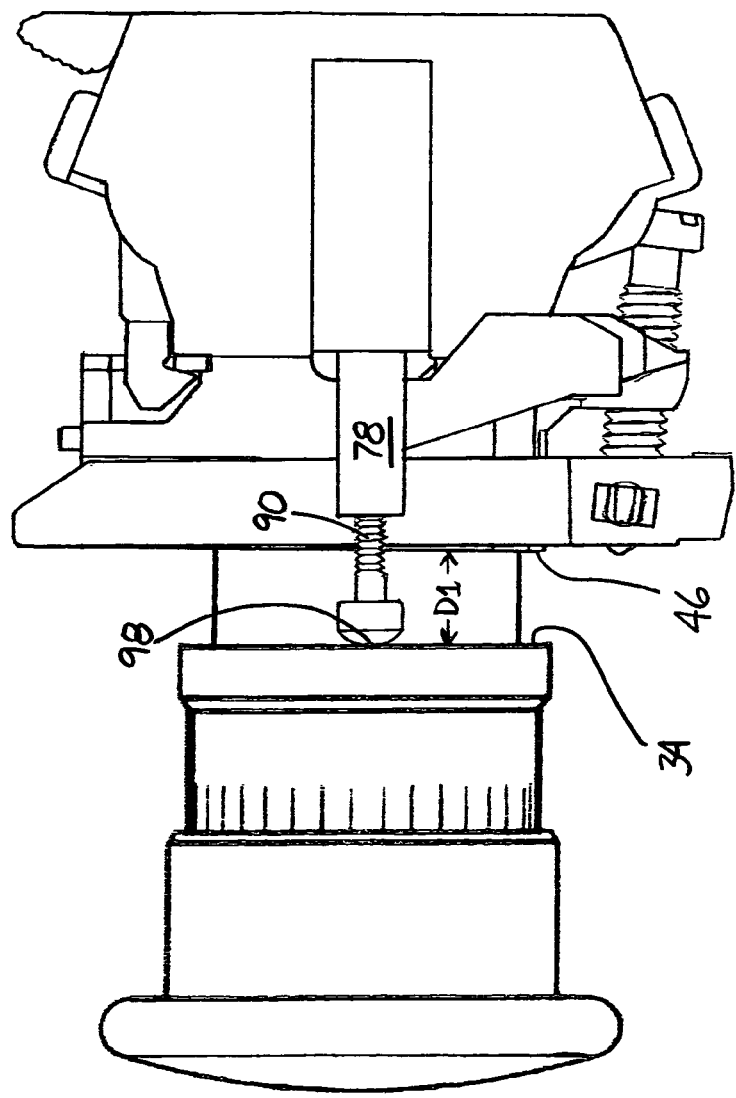
FIG. 4 illustrates an assembled pushbutton switch assembly incorporating the interlock contact block of FIG. 3.

FIG. 4 illustrates an assembled pushbutton assembly 10 (no wall 110) with the interlock contact block 58 of FIG. 3 installed. When the pushbutton assembly 10 is assembled without the wall 110 between the button assembly 14 and mounting block assembly 18, the distal end 98 of the self-adjusting member 90 extends at least to the stepped flange 34 of the barrel 30. This is the pre-adjustment state, wherein the movable contact 66 is in the OPEN position.

Figure 5:
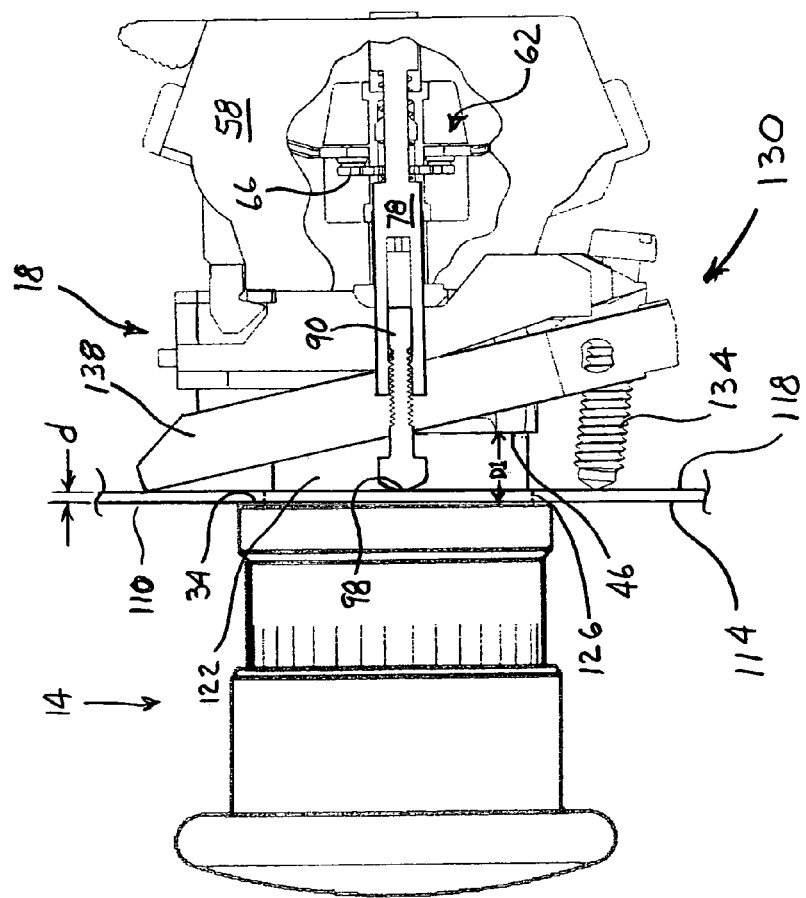
FIG. 5 illustrates a pushbutton switch assembly with an interlock contact block of the present invention installed on a thin wall enclosure.
Figure 6:
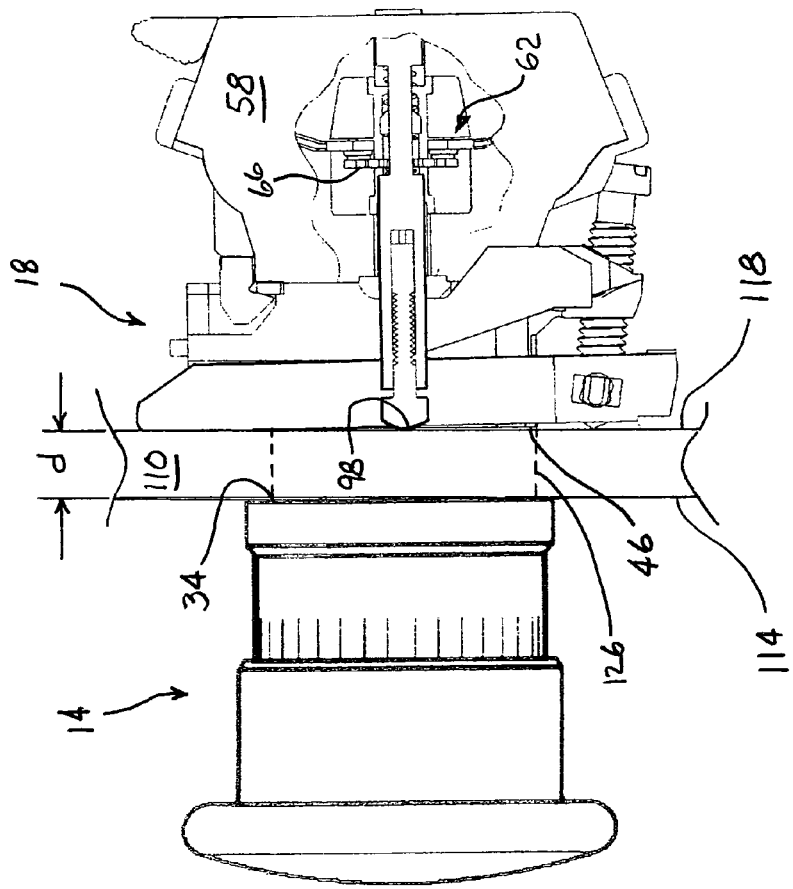
FIG. 6 illustrates a pushbutton switch assembly with a contact block of the present invention installed on a thick wall enclosure.

Referring now to FIGS. 5-7, the pushbutton assembly 14 is generally located on an outside surface 114 of wall 110 of an electrical enclosure such as a panelboard, electrical box or machine station with the mounting block assembly 18 and attached interlock contact block 58 and other contact blocks 22 located on an inside surface 118 of the wall 110. The maintained distance D1 provides sufficient space between the stepped flange 34 and the base surface 46 for walls 110 of varying thickness d (FIGS. 5 and 6) as required by the enclosure size, structural requirements or particular application. It expected that the distance D1 should not exceed ⅜ of an inch. The barrel 30 has a connecting end 122 (best shown in FIG. 1) that is passed through an aperture 126 (indicated by dashed lines) in the wall 110.

FIG. 5 illustrates a pushbutton assembly 10 with interlock contact block 58 installed on a thin wall 110. The connecting end 122 of barrel 30 has been inserted through the aperture 126 in wall 110 until stepped flange 34 is against the outside surface 114 of wall 110. The mounting block assembly 18 is then installed on to the connecting end 122 of barrel 30. As the mounting block assembly 18 is being install the distal end 98 of self-adjusting member 90 engages the inside surface 118 of wall 110 causing the interlock arm 78 to be moved into the interlock contact block 58. Movement of the interlock arm 78 caused the movable contact 66 to engage the fixed contact 70 thereby closing the normally open interlock contact 62. Any further movement of the self-adjusting member 90 required to complete the connection between the pushbutton assembly 14 and mounting block assembly 18 causes the self-adjusting arm 90 to be forced further into cavity 86 of the interlock arm 78. This movement causes the retaining grooves 106 of self-adjusting member 90 to be ratcheted past the at least one retaining member 102 of the interlock arm 78. When the connection between the pushbutton assembly 14 and mounting block assembly 18 is complete, the connected position of the self-adjusting member 90 with respect to the interlock arm 78 will be maintained by the engagement of the at least one retaining member 102 and the groove 106 that it engages at the connected position. A securing means 130, in this embodiment screw 134 and yoke 138, will be adjusted to firmly clamp the wall 110 between the stepped flange 34 of barrel 30 on the outside surface 114 and the screw 134 and yoke 138 on the inside surface 118.

FIG. 6 illustrates the pushbutton assembly 10 with interlock contact block 58 installed on a thick wall 110. The installation operation is the same but the self-adjusting member 90 has been forced further into the cavity 86 of interlock arm 78 by the thicker wall 110.

FIG. 7 illustrates a condition wherein the mounting block assembly 18 has become disconnected from the pushbutton assembly 14 or sufficiently loose to prevent proper operation of other electrical contacts in the interlock contact block 58 or other contact blocks 22 attached to the mounting block assembly 18. In this condition the distal end 98 of the self-adjusting member 90 can still be in contact with the inside surface 118 of wall 110, but the interlock arm 78 has been moved out of the interlock contact block 58 by the biasing spring 74 of normally open interlock contact 62. This movement causes the movable contact 66 to separate from the fixed contact 70 and thereby open the normally open interlock contact 62. It is to be understood that separation of the interlock contact block 58 from the mounting block assembly 18 will also result in the opening of normally open interlock contact 62. It is also to be understood that the interlock contact block 58 of the present invention will perform the same function when used with pushbutton assemblies having other means for being assembled to a wall of an electrical enclosure.

In one well known alternative embodiment of the pushbutton switch assembly 10 (not shown), the barrel 30 is an integral part of the base 42, and does not have a stepped flange 34 but is threaded to accept a fastener such as a nut. The operator 38 is captivated inside the barrel 30 and provided with means for attaching the button 26. To install the pushbutton switch assembly 10, the barrel 30 is inserted into the aperture 126 from inside the electrical enclosure until the surface 46 of mounting block assembly 18 is against the inside surface 118 of the wall 110. The fastener is then assembled onto the barrel 30 until it tightly engaged the outside surface 114 of the wall 110. The securing means 130 in this embodiment is the combination of surface 46 of the mounting block assembly 18 and the nut as disclosed in U.S. Pat. No. 3,239,641. For proper operation with this type of pushbutton assembly, the cavity 86 of the interlock arm 78 must have sufficient depth to receive the self-adjusting member 90 such that its distal end 98 does not extend past the surface 46 of mounting block assembly 18 when the switch assembly 10 is properly installed on the wall 110.

We claim:

1. An assembly mounted on electrical enclosures or panels, comprising:
    a pushbutton assembly;
    a mounting block assembly connected to the pushbutton assembly, the mounting block assembly having means for securing the switch assembly to a wall of the electrical enclosure or panel; and
    an interlock contact block attached to the mounting block assembly, the interlock contact block having a housing and at least one normally open interlock contact enclosed within the housing, the interlock contact being biased to a closed position by an interlock arm in physical contact with the wall of the electrical enclosure or panel when the pushbutton switch assembly is installed thereon,
    the interlock arm including a self-adjusting member for automatically adjusting the length of the interlock arm within a predetermined adjustment range to compensate for a variation in the thickness of the wall on which the pushbutton switch assembly is installed, the self-adjusting member having a proximate end that is slidably received into a cavity defined in a distal end of the interlock arm, the self-adjusting member having a distal end that engages an inside surface of the wall when the pushbutton switch assembly is installed thereon,
    the interlock arm being movable such that if proper operation of the interlock contact block by the pushbutton assembly is prevented, the interlock contact will automatically resume its normally open position.

2. The assembly of claim 1, wherein the interlock arm is movable with respect to the interlock contact housing.

3. The assembly of claim 1, wherein the interlock contact includes a fixed contact and a movable contact, the movable contact being operably connected to the interlock arm for movement therewith.

4. The assembly of claim 3, wherein the movable contact of the interlock contact is moved between an OPEN position and a CLOSED position in response to movement of the interlock arm.

5. The assembly of claim 1, wherein the movable contact is biased to the OPEN position by a spring.

6. The assembly of claim 5, wherein an increase in distance between the wall and the interlock contact block allows the spring to move the movable contact to the OPEN position.

7. The assembly of claim 1, wherein the interlock arm defines at least one retaining member extending into the cavity, the at least one retaining member engaging a series of grooves defined in the surface of the self-adjusting member for maintaining an adjusted position of the self-adjusting member with respect to the interlock arm.

8. The assembly of claim 7, wherein the adjusted position is achieved by forcing the self-adjusting member into the cavity as the pushbutton assembly and mounting block assembly are installed on the wall.

9. The assembly of claim 7, wherein the adjusted position is achieved by forcing the self-adjusting member into the cavity as the interlock contact block is attached to the mounting block assembly installed on the wall.

10. The assembly of claim 1, wherein the predetermined adjustment range includes a position at which the distal end of the self-adjusting member is aligned with a surface of the pushbutton assembly and a position at which the distal end of the self-adjusting member is aligned with a surface of the mounting block assembly.

11. An assembly providing an automatic electrical disconnect for a panel mounted pushbutton switch assembly, the assembly comprising:
    a housing connected to a pushbutton switch assembly mounted in a panel wall, the switch assembly including a pushbutton assembly and a mounting block assembly;
    a normally open interlock contact enclosed within the housing and having at least one fixed electrical contact and at least one movable electrical contact;
    an interlock arm extending outwardly from the housing and movable with respect to the housing, the interlock arm including self-adjusting member for automatically adjusting the length of the interlock arm to compensate for a variation in the thickness of the wall on which the pushbutton switch assembly is installed, the self-adjusting member having a proximate end that is slidably received into a cavity defined in a distal end of the interlock arm, the self-adjusting member having a distal end that engages an inside surface of the wall when the pushbutton switch assembly is installed thereon, the interlock arm being operably connected to the movable contact inside the housing and the distal end of the interlock arm being forcibly engaged by the panel wall such that the interlock arm is moved into the housing thereby causing the movable contact to be moved into electrical engagement with the fixed contact; and
    wherein a movement of the housing away from the panel wall permits the interlock arm to move outward from the housing thereby electrically disconnecting the movable contact from the fixed contact.

* * * * *